United States Patent
Du et al.

(10) Patent No.: US 8,150,162 B2
(45) Date of Patent: Apr. 3, 2012

(54) METHOD AND SYSTEM FOR THREE-DIMENSIONAL HANDWRITING RECOGNITION

(75) Inventors: Yonggang Du, Shanghai (CN); Jiawen Tu, Shanghai (CN); Lei Feng, Shanghai (CN); Xiaoling Shao, Shanghai (CN)

(73) Assignee: Koninklijke Philips Electronics N.V., Eindhoven (NL)

(*) Notice: Subject to any disclaimer, the term of this patent is extended or adjusted under 35 U.S.C. 154(b) by 1160 days.

(21) Appl. No.: 10/528,938

(22) PCT Filed: Sep. 18, 2003

(86) PCT No.: PCT/IB03/04102
§ 371 (c)(1),
(2), (4) Date: Aug. 29, 2005

(87) PCT Pub. No.: WO2004/029866
PCT Pub. Date: Apr. 8, 2004

(65) Prior Publication Data
US 2006/0149737 A1    Jul. 6, 2006

(30) Foreign Application Priority Data

Sep. 28, 2002  (CN) .................................. 02 1 44248

(51) Int. Cl.
*G06K 9/00* (2006.01)
(52) U.S. Cl. .......................... 382/187; 382/181; 382/188
(58) Field of Classification Search .................. 382/188, 382/187, 181
See application file for complete search history.

(56) References Cited

U.S. PATENT DOCUMENTS

| | | | | |
|---|---|---|---|---|
| 5,568,565 | A * | 10/1996 | Minakata | 382/187 |
| 6,212,296 | B1 * | 4/2001 | Stork et al. | 382/188 |
| 6,226,404 | B1 * | 5/2001 | Ikebata | 382/187 |
| 6,233,351 | B1 * | 5/2001 | Feeney et al. | 382/155 |
| 6,628,847 | B1 * | 9/2003 | Kasabach et al. | 382/314 |
| 6,737,591 | B1 * | 5/2004 | Lapstun et al. | 178/19.05 |
| 2001/0004254 | A1 * | 6/2001 | Okahara et al. | 345/157 |
| 2003/0215140 | A1 * | 11/2003 | Gounares et al. | 382/187 |
| 2004/0003071 | A1 * | 1/2004 | Mathew et al. | 709/223 |

FOREIGN PATENT DOCUMENTS

WO         WO9521436 A    8/1995

* cited by examiner

*Primary Examiner* — Edward Zee

(57) ABSTRACT

The present invention provides a 3D handwriting recognition system that allows users to freely write words or characters in a 3D space in a touchless manner, without requiring any physical medium such as a pad or a tablet. The users' handwriting input in a 3D space will be tracked by an input device of the system that generates corresponding 3D motion data and wirelessly transfers the 3D motion data to a recognition device of the system. The 3D motion data will be converted and then mapped onto a 2D plane to generate corresponding 2D images for handwriting recognition. In this way, the users' inputting will never be limited to any screen, pad or plane, and the users will have more flexibility and enjoyable writing experience.

29 Claims, 4 Drawing Sheets

EXHIBIT B

METHOD AND SYSTEM FOR THREE-DIMENSIONAL HANDWRITING RECOGNITION

BACKGROUND OF THE INVENTION

The invention relates generally to handwriting recognition technologies, and more particularly to three-dimensional (3D) handwriting recognition methods and systems.

Handwriting recognition is a technique by which an intelligence system can recognize characters and other symbols written by hand. This technique has been very popular since it frees users from the keyboard, allowing users to write and draw in a more natural way. With the increasing demands from users, more and more devices now have incorporated handwriting recognition system to give users natural input experience. Handwriting recognition is particularly popular in various handheld devices that provides handwriting recognition of words with complex structures, e.g., Chinese characters, input of which using a conventional keyboard is very time consuming.

A handwriting input device provides a user with a friendly way of inputting information. At present, the minimum requirement for an inputting device is a mouse. To write with the mouse, the user needs to press and hold down the primary mouse button, and then move the mouse pointer to form strokes of a word or character for generating the final word or character. Popular handwriting input devices, such as a pen stylus and tablet, are used on conventional handheld devices such as PDAs, or are connected to a computer through a serial or USB port. Handheld devices often use a pen stylus and a touch screen as a pad to allow users to perform recognition functions. Most handheld devices, such as PDAs, are equipped with this kind of input device.

Another kind of handwriting input device includes a pen that allows users to transfer data into a receiving unit, such as a cellular phone, a PDA or a PC by simply writing or drawing in their own natural handwriting on the comfort and space of a regular piece of paper.

At present, all conventional handwriting input devices adopt a two-dimensional input method. Users have to write on a physical medium, such as a tablet, a touch screen, or a paper pad. This limits the choices available for users. For example, if a user wants to write some comments during a presentation or a lecture, he or she would have to first find a physical medium, e.g., a table, a paper pad, etc. This can cause much inconvenience for the user while standing in the room, giving the presentation or lecture. Also, in a mobile environment, such as in a car, a bus or a subway, it would be very inconvenient to "write" on a physical medium using a stylus.

Therefore, there is a need to provide an improved handwriting recognition system that gives users more flexibility and convenience and frees the users from the physical medium required for two-dimensional handwriting recognition.

SUMMARY OF THE INVENTION

The present invention gives users more flexibility and enjoyable writing experience by allowing users to freely write words or characters in a 3D space in a touchless way, without requiring any physical medium such as a pad or a tablet.

According to the invention, there is provided a handwriting recognition system that comprises an input device and a recognition device in communication with the input device. The input device includes a three-dimensional (3D) motion detection sensor configured to generate 3D motion data in response to a 3D motion. In one embodiment, the motion detection sensor measures acceleration of the 3D motion in X, Y and Z axial directions to generate the 3D motion data. The recognition device is configured to receive (e.g., by wireless means) the 3D motion data from the input device and derive corresponding two-dimensional (2D) images for handwriting recognition, based on the 3D motion data.

According to one embodiment of the invention, the recognition device calculates corresponding 3D coordinates based on the 3D motion data, constructs corresponding 3D tracks based the 3D coordinates, and derives the corresponding 2D images from the 3D tracks by mapping the 3D tracks onto a 2D plane for handwriting recognition.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
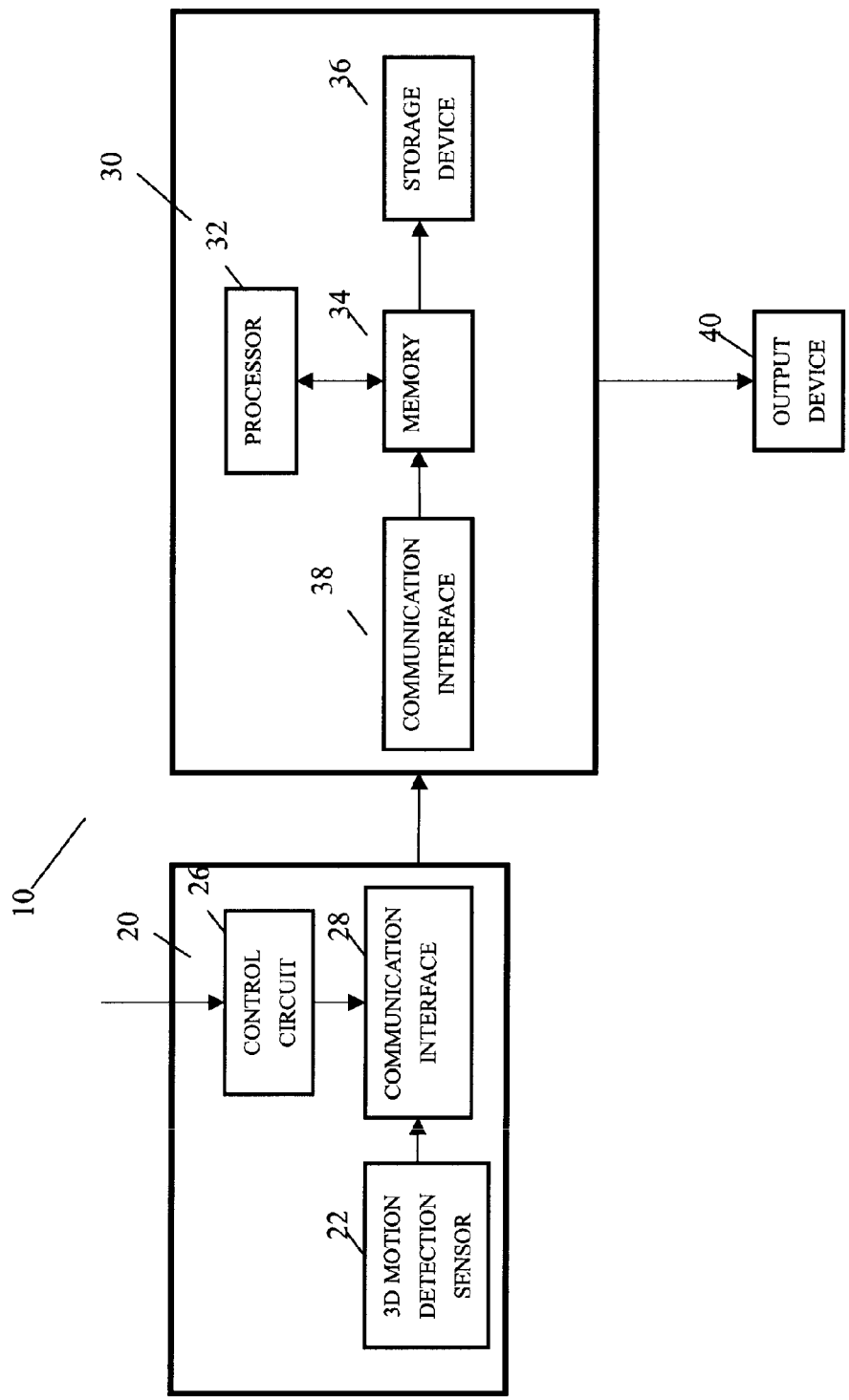
FIG. 1 shows a three-dimensional handwriting recognition system according to one embodiment of the invention.

FIG. 1 shows a three-dimensional handwriting recognition system 10 according to one embodiment of the invention. As illustrated, system 10 comprises a handwriting input device 20, a recognition device 30 and an output device 40. Input device 20 includes a 3D motion detection sensor 22, a control circuit 26 and a communication interface 28. Recognition device 30 includes a processor 32, a memory 34, a storage device 36, and a communication interface 38. For simplicity, other conventional elements are not shown in FIG. 1.

In operation, a user moves input device 20 to freely write words or characters in a 3D space, e.g., in the air. Motion detection sensor 22 detects the 3D motion and communicates the 3D motion data and a sampling rate to recognition device 30 for handwriting recognition via a communication interface 28, such as Bluetooth, Zigbee, IEEE 802.11, infrared, or a USB port. The sampling rate may be a predetermined value set by an end user or a manufacturer based on factors such as the processing capability of the system. Alternatively, the sampling rate may be dynamically determined and adjusted based on, for example, the speed of the motion. This can be done, for example, by first determining the speed of the initial motion associated with the handwriting. Then the recognition device can dynamically adjust the sampling rate based on the speed of the motion at the last sampling point. The higher the speed is, the higher the sampling rate will be, and vice versa. By dynamically adjusting the sampling rate, the accuracy of the handwriting recognition can be improved since only the optimal number of sampling points will be used for constructing the word or character. Further, lower power consumption is needed.

Based on the motion data and the sampling rate received from input device 20, processor 32 calculates the corresponding 3D coordinates on the X, Y and Z axes and stores these coordinates in storage device 36. Using the calculated coordinates, processor 32 constructs the corresponding 3D tracks. The 3D tracks will then be projected onto a 2D plane to form 2D images which will be recognized using conventional handwriting recognition software. The final result is displayed on output device 40.

Since 3D writing is a continuous process, control circuit 26 of input device 20 provides a control signal to recognition device 30 via interface 28 to indicate separation of individual words or characters upon receiving a user provided external input. For example, the user may press a control button to cause control circuit 26 to generate the control signal after completion of writing a word or a character.

According to a specific embodiment of the invention, motion detection sensor 22 detects the 3D motion by measuring the acceleration of the movement along the X, Y and Z axes. As an example, the piezoresistive-type tri-axial accelerating sensor commercially available from Hitachi Metals, Ltd., Tokyo, Japan, may be used as motion detection sensor 22. This accelerating sensor in the form of an IC chip has the ability to simultaneously detect acceleration in the three axial directions (X, Y and Z). The sensor is highly sensitive and shock resistant and is a very small and thin semiconductor type 3 axial accelerating sensor.

Figure 2:
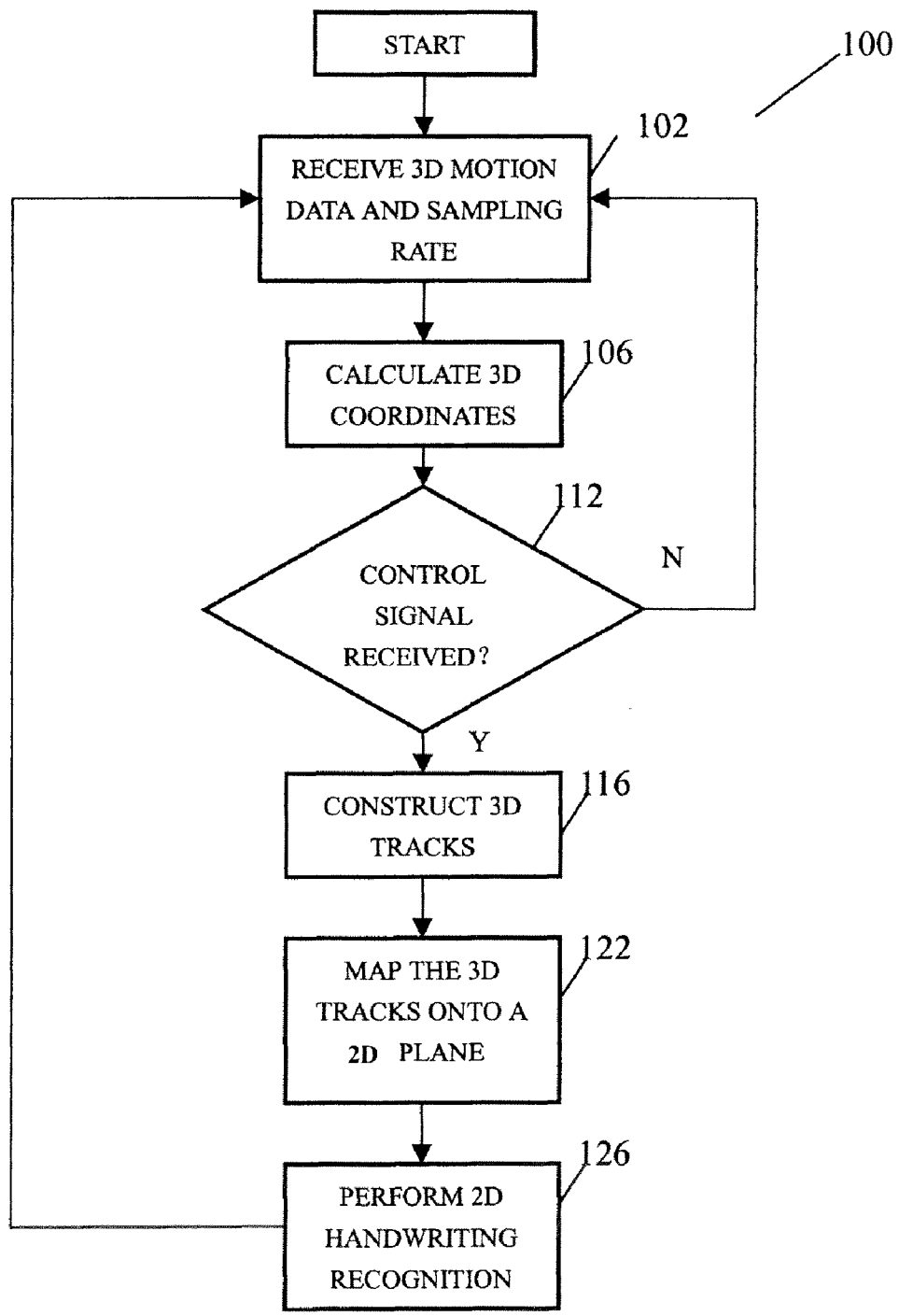
FIG. 2 is a flow chart diagram illustrating a recognition process according to one embodiment of the invention.

FIG. 2 is a flow chart diagram illustrating a recognition process 100 performed by recognition device 30, according to one embodiment of the invention. In FIG. 2, recognition device 30 receives the 3D motion data (e.g., the acceleration data of the movement in the X, Y and Z directions) and the sampling rate from input device 20 (step 102). Based on the information received, processor 32 calculates the corresponding 3D coordinates on the X, Y and Z axes for each sampling point using the starting point of the movement as the origin (step 106). Each sampling point is also used as a reference point for calculating the coordinates of the following sampling point.

Calculation of the 3D coordinates is continuously performed based on the incoming 3D motion data until processor 32 detects receipt of a control signal (step 112). The control signal indicates completion of writing a word or a character. The corresponding 3D tracks are constructed using the 3D coordinates (step 116) and are then mapped onto a 2D plane (step 122). Thereafter, conventional 2D handwriting recognition is performed (step 126).

In the above recognition process 100, to map the 3D tracks onto a 2D plane at step 122, it is necessary to first find a proper 2D projection plane. In a preferred embodiment of the invention, a proper 2D projection plane is separately derived for each word or character.

According to the geometry principles, a proper 2D projection plane is a plane, to which the sum of the distance square of each sampling point is minimal. Assume the coordinates of n sampling points are known as follows: $(x_1, y_1, z_1)$, $(x_2, y_2, z_2)$ ... $(x_n, y_n, z_n)$, and the equation of the plane is $Ax+By+Cz+D=0$, where $(A^2+B^2+C^2 \neq 0)$. Now it is necessary to determine the values of A, B, C, D. The distance from one point $(x_1, y_1, z_1)$ to the plane is given as $$d_1 = \frac{|Ax_1 + By_1 + Cz_1 + D|}{\sqrt{A^2 + B^2 + C^2}},$$

and the sum $$\sum_{i=1}^{n} d_i^2$$

represented by F(A,B,C,D) is expressed as:

$$F(A, B, C, D) = \sum_{i=1}^{n} d_i^2 = \frac{(Ax_1 + By_1 + Cz_1 + D)^2 + (Ax_2 + By_2 + Cz_2 + D)^2 + \ldots + (Ax_n + By_n + Cz_n + D)^2}{(A^2 + B^2 + C^2)}$$

The values of A, B, C, D can be determined using the Lagrange multiplication method as follows, which is described in *Mathematics Analysis* by Ouyang Guangzhong, published by Fudan University Press in 1999 in China, which is hereby incorporated by reference. Thus, $$F(A,B,C,D)=F'(A,B,C,D)=(Ax_1+By_1+Cz_1+D)^2+(Ax_2+By_2+Cz_2+D)^2+\ldots+(Ax_n+By_n+Cz_n+D)^2$$

under the constraint $A^2+B^2+C^2=1$. From this equation, the following equation is derived:

$$G(A,B,C,D)=F'(A,B,C,D)+\lambda(A^2+B^2+C^2-1),$$

where $\lambda$ is a Lagrange multiplier, which is a constant. The partial differential functions are now performed on G(A, B, C, D) with respect to A, B, C and D as follows:

$$\frac{\partial G(A, B, C, D)}{\partial A} = 0$$

$$\frac{\partial G(A, B, C, D)}{\partial B} = 0$$

$$\frac{\partial G(A, B, C, D)}{\partial C} = 0$$

$$\frac{\partial G(A, B, C, D)}{\partial D} = 0$$

From the above four equations, the following equations are obtained:

$$A\left(\sum_{i=1}^{n} (x_i * x_i) + \lambda\right) + B\sum_{i=1}^{n} (x_i * y_i) + C\sum_{i=1}^{n} (x_i * z_i) + D\sum_{i=1}^{n} x_i = 0 \quad (1)$$

$$A\sum_{i=1}^{n} (x_i * y_i) + B\left(\sum_{i=1}^{n} (y_i * y_i) + \lambda\right) + C\sum_{i=1}^{n} (y_i * z_i) + D\sum_{i=1}^{n} y_i = 0 \quad (2)$$

$$A\sum_{i=1}^{n} (x_i * z_i) + B\sum_{i=1}^{n} (z_i * y_i) + C\left(\sum_{i=1}^{n} (z_i * z_i) + \lambda\right) + D\sum_{i=1}^{n} z_i = 0 \quad (3)$$

$$A\sum_{i=1}^{n} x_i + B\sum_{i=1}^{n} y_i + C\sum_{i=1}^{n} z_i + nD = 0 \quad (4)$$

$$A^2 + B^2 + C^2 = 1 \quad (5)$$

where equation (4) can be rewritten as:

$$D = -\frac{1}{n}\left(A\sum_{i=1}^{n} x_i + B\sum_{i=1}^{n} y_i + C\sum_{i=1}^{n} z_i\right) \quad (6)$$

By incorporating equation (6) into equations (1), (2), and (3), the following is obtained:

$$\begin{bmatrix} \sum_{i=1}^{n}(x_i*x_i) - \frac{1}{n}\sum_{i=1}^{n}(x_i*x_i) & \sum_{i=1}^{n}(x_i*y_i) - \frac{1}{n}\sum_{i=1}^{n}(x_i*y_i) & \sum_{i=1}^{n}(x_i*z_i) - \frac{1}{n}\sum_{i=1}^{n}(x_i*z_i) \\ \sum_{i=1}^{n}(x_i*y_i) - \frac{1}{n}\sum_{i=1}^{n}(x_i*y_i) & \sum_{i=1}^{n}(y_i*y_i) - \frac{1}{n}\sum_{i=1}^{n}(y_i*y_i) & \sum_{i=1}^{n}(z_i*y_i) - \frac{1}{n}\sum_{i=1}^{n}(z_i*y_i) \\ \sum_{i=1}^{n}(x_i*z_i) - \frac{1}{n}\sum_{i=1}^{n}(x_i*z_i) & \sum_{i=1}^{n}(z_i*y_i) - \frac{1}{n}\sum_{i=1}^{n}(z_i*y_i) & \sum_{i=1}^{n}(z_i*z_i) - \frac{1}{n}\sum_{i=1}^{n}(z_i*z_i) \end{bmatrix} * \begin{bmatrix} A \\ B \\ C \end{bmatrix} = -\lambda \begin{bmatrix} A \\ B \\ C \end{bmatrix} \qquad (7)$$

Thus, from the above equations, the values of A, B, C and D can be obtained.

As an example, the following 3D coordinates for a total of 13 sampling points are obtained for a Chinese character: {(0,0,0),(0.49,−1,0.02),(1,0,0.03),(0,0,0.02),(2,−0.13, 0.01), (3.5,−0.14,0),(3.76,−0.31,−0.01),(2.74,−1.26, 0.01),(1.38,−2.24,0),(2.5,−2,0.01),(1.746,1,0.02),(2,−1,5, 0.03),(1.876,−4,5,0.02),}.

By using the Lagrange multiplication method described above, the following are obtained:

$$\begin{bmatrix} 53.407 & -23.6725 & 0.1911 \\ -23.6725 & 36.2195 & -0.2084 \\ 0.1911 & -0.2084 & 0.0035 \end{bmatrix} * \begin{bmatrix} A \\ B \\ C \end{bmatrix} = -\lambda \begin{bmatrix} A \\ B \\ C \end{bmatrix},$$

$A^2+B^2+C^2=1$, and $$D = -\frac{1}{13}\left(A\sum x_i + B\sum y_i + C\sum z_i\right).$$

From the above equations, the values of A, B, C and D are determined as follows:

$A=0.0045, B=0.0023, C=0.9999, D=-0.01777.$

Figure 3:
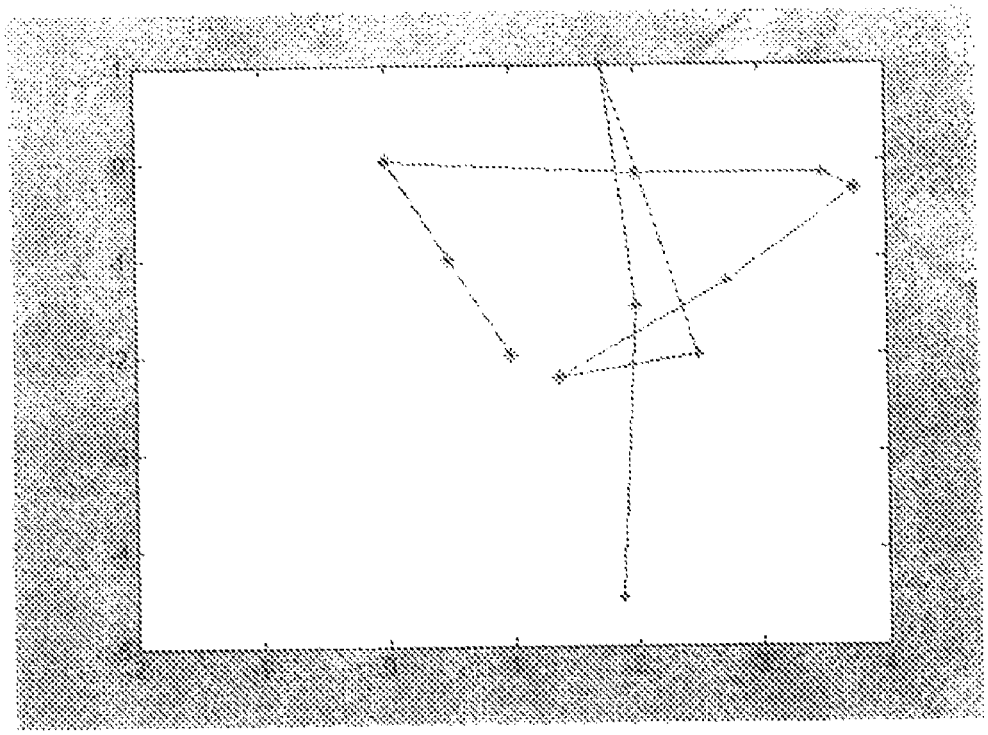
FIG. 3A shows a 2D image of a Chinese character derived by mapping 3D tracks onto a 2D projection plane.
FIG. 3B shows a final result of handwriting recognition process based on the 2D image in FIG. 3A.
Figure 3:
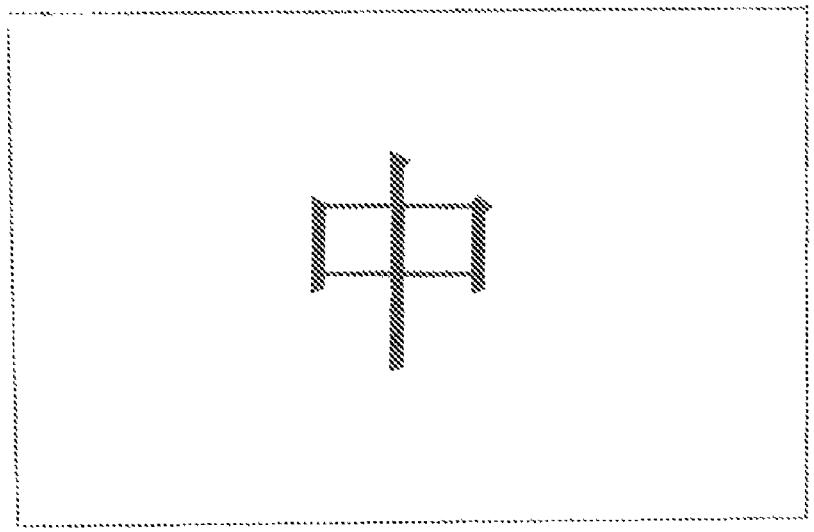

Thus, the equation of the 2D projection plane is 0.0045x+ 0.0023y+0.9999z−0.01777=0. From the equation of the projection plane, Ax+By+Cz+D=0, and the equation of a line that is vertical to the projection plane, $$\frac{x-x_i}{A} = \frac{y-y_i}{B} = \frac{z-z_i}{C},$$

the following equations are derived:

$$x = \frac{(B^2+C^2)x_i - A(By_i+Cz_i+D)}{A^2+B^2+C^2}$$
$$y = \frac{(A^2+C^2)y_i - B(Ax_i+Cz_i+D)}{A^2+B^2+C^2}$$

which can be used to obtain the corresponding 2D coordinates for each 3D sampling point. In this example, the following corresponding 2D coordinates are obtained: {(0.0001, 0),(0.49,−1),(1,−2.0001),(0,0),(2,−0.13),(3.5001,−0.14), (3.7601,−0.31),(2.7401,−1.26),(1.3801, 2.24),(2.5001,−2),(1.746,1),(2,−1.5001),(1.876,−4.5001)}. Based on these 2D coordinates, the corresponding 2D image is projected onto the 2D projection plane. The result of this Chinese character is shown in FIG. 3A. The final result is generated by performing a conventional 2D handwriting recognition process, as shown in FIG. 3B.

In the above, the Lagrange multiplication method is used to obtain the values of A, B, C and D. Other methods such as linear regression method may also be used.

Figure 4:
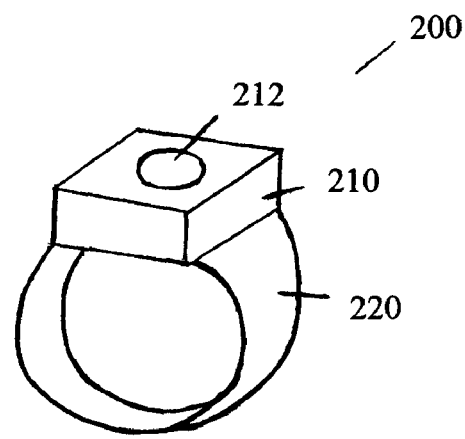
FIG. 4 shows an external design of a 3D handwriting input device according to one embodiment of the invention.

FIG. 4 shows an external design of a 3D handwriting input device 200 according to one embodiment of the invention. As shown in FIG. 4, input device 200 includes a housing 210 that contains the electronics parts of the device (such as a 3D motion detection sensor IC chip), a control button 212 for allowing a user to input a control signal to indicate completion of writing a word or character, and a band 220 for mounting input device 200 on the user's finger.

Figure 5:
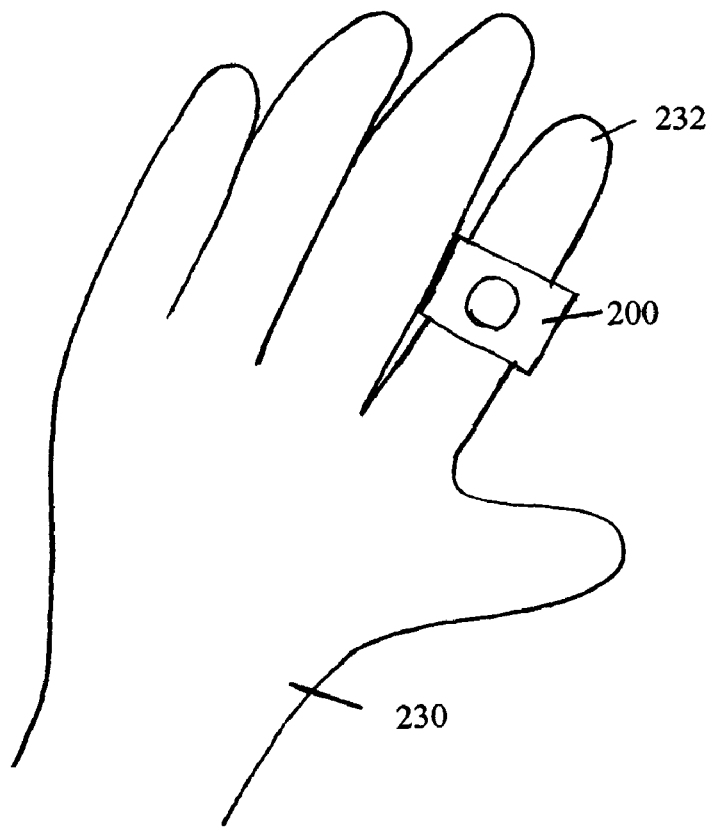
FIG. 5 illustrates how the input device may be mounted.

FIG. 5 illustrates how input device 200 may be mounted. In FIG. 5, device 200 is mounted on a finger 232 of a user's hand 230. By mounting it on the finger, the user can simply move the finger to write any word or character in a 3D space. The 3D motion data will be wirelessly transmitted to a recognition device for handwriting recognition.

According to the invention, the input device and the recognition device can be integrated together as a single unit (e.g., a pen) that operates in the same manner as described above. The final recognition results will be transmitted to an intelligent apparatus such as a PDA, a laptop computer, a PC, etc.

The invention can also be used on a 2D plane if the user so chooses. In such a case, the coordinates calculated will be for 2D plane and the step of mapping the 3D tracks onto a 2D plane is omitted.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

The invention claimed is:

1. A handwriting recognition system, comprising:
    an input device including a three-dimensional (3D) motion detection sensor that is configured to generate 3D motion data in response to a 3D motion; and
    a recognition device, in communication with the input device, that is configured to receive the 3D motion data and derive corresponding two-dimensional (2D) images for handwriting recognition wherein a proper 2D projection plane is derived, using the 3D motion data, for each word or character; said proper 2D projection plane is where a sum of the distance square of each 3D sampling point is minimal, wherein the sum of the distance square is determined using a predetermined algorithm and a predetermined number of 3D sampling points and their respective distances to the 2D projection plane; and wherein the recognition device is further configured to dynamically adjust the sampling rate of the 3D motion data based on the speed of the 3D motion.

2. The system of claim 1, wherein the recognition device includes means for performing 2D handwriting recognition based on the 2D images.

3. The system of claim 1, wherein the recognition device includes:
   means for calculating corresponding 3D coordinates based on the 3D motion data;
   means for constructing corresponding 3D tracks based the 3D coordinates; and
   means for deriving the corresponding 2D images from the 3D tracks.

4. The system of claim 3, wherein the deriving means includes means for mapping the 3D tracks onto a 2D plane for deriving the 2D images for handwriting recognition.

5. The system of claim 3, wherein the recognition device includes means for performing 2D handwriting recognition based on the 2D images.

6. The system of claim 4, wherein the calculating means calculates the corresponding 3D coordinates of each sampling point based on the 3D motion data and a selected sampling rate.

7. The system of claim 3, wherein the input device further includes a control circuit, responsive to a user's command, that is configured to generate a control signal for transmitting to the recognition device to indicate completion of writing a word or a character.

8. The system of claim 3, wherein the motion detection sensor measures acceleration of the 3D motion in X, Y and Z axial directions to generate the 3D motion data.

9. The system of claim 5, further comprising an output device for displaying final results of the handwriting recognition.

10. The system of claim 1, wherein the input device further includes a control circuit, responsive to a user's command, that is configured to generate a control signal for transmitting to the recognition device to indicate completion of writing a word or a character.

11. The system of claim 1, wherein the motion detection sensor measures acceleration of the 3D motion in X, Y and Z axial directions to generate the 3D motion data.

12. The system of claim 1, wherein the input device wirelessly transmits the 3D motion data to the recognition device.

13. The system of claim 1, wherein the predetermined algorithm is $$F(A, B, C, D) = \sum_{i=1}^{n} d_i^2 = \frac{((Ax_1 + By_1 + Cz_1 + D)^2 + (Ax_2 + By_2 + Cz_2 + D)^2 + \ldots + (Ax_n + By_n + Cz_n + D)^2)}{(A^2 + B^2 + C^2)}$$

where $(x_1, y_1, z_1), (x_2, y_2, z_2) \ldots , (x_n, y_n, z_n)$ are the predetermined sampling points, and A, B, C and D are determined using a linear regression method.

14. The system of claim 13, wherein the derived corresponding two-dimensional (2D) images for handwriting recognition is derived from the predetermined algorithm to be $$x = \frac{(B^2 + C^2)x_i - A(By_i + Cz_i + D)}{A^2 + B^2 + C^2}$$

$$y = \frac{(A^2 + C^2)y_i - B(Ax_i + Cz_i + D)}{A^2 + B^2 + C^2}$$

where x and y are 2D coordinates of the two-dimensional (2D) images on said proper 2D projection plane.

15. A computing system, comprising:
   a memory;
   an input device including a three-dimensional (3D) motion detection sensor that is configured to generate 3D motion data in response to a 3D motion; and
   a recognition device, operably coupled to the memory and in communication with the input device, that is configured to receive the 3D motion data and derive corresponding two-dimensional (2D) images for handwriting recognition wherein a proper 2D projection plane is derived, using the 3D motion data, for each word or character; said proper 2D projection plane is where a sum of the distance square of each 3D sampling point is minimal, wherein the sum of the distance square is determined using a predetermined algorithm and a predetermined number of 3D sampling points and their respective distances to the 2D projection plane; and wherein the recognition device is further configured to dynamically adjust the sampling rate of the 3D motion data based on the speed of the 3D motion.

16. The system of claim 15, wherein the recognition device includes means for performing 2D handwriting recognition based on the 2D images.

17. The system of claim 15, wherein the recognition device includes:
   means for calculating corresponding 3D coordinates based on the 3D motion data;
   means for constructing corresponding 3D tracks based the 3D coordinates; and
   means for deriving the corresponding 2D images from the 3D tracks.

18. The system of claim 17, wherein the deriving means includes means for mapping the 3D tracks onto a 2D plane for deriving the 2D images for handwriting recognition.

19. A handwriting recognition method using a recognition system having a three-dimensional (3D) motion detection sensor and a recognition device, the method comprising the steps of:
   generating 3D motion data in response to a 3D motion, using the three-dimensional (3D) motion detection sensor;
   deriving corresponding two-dimensional (2D) images for handwriting recognition wherein a proper 2D projection plane is derived, using the 3D motion data, for each word or character; said proper 2D projection plane is where a sum of the distance square of each 3D sampling point is minimal, wherein the sum of the distance square is determined using a predetermined algorithm and a predetermined number of 3D sampling points and their respective distances to the 2D projection plane; and
   dynamically adjusting the sampling rate of the 3D motion based on the speed of the 3D motion.

20. The method of claim 19, further comprising the step of performing 2D handwriting recognition based on the 2D images.

21. The method of claim 19, further comprising the steps of:
   calculating corresponding 3D coordinates based on the 3D motion data;
   constructing corresponding 3D tracks based the 3D coordinates; and
   deriving the corresponding 2D images from the 3D tracks.

22. The method of claim 21, wherein the step of deriving the corresponding 2D images from the 3D tracks includes mapping the 3D tracks onto a 2D plane for deriving the 2D images for handwriting recognition.

23. The method of claim 21, further comprising a step of performing a 2D handwriting recognition based on the 2D images.

24. The method of claim 22, wherein the corresponding 3D coordinates of each sampling point are calculated based on the 3D motion data and a selected sampling rate.

25. The method of claim 21, further comprising the step of generating an indication, based on a user's command, to indicate completion of writing a word or a character.

26. The method of claim 21, further comprising the step of measuring acceleration of the 3D motion in X, Y and Z axial directions and wherein the 3D motion data are generated based on the acceleration of the 3D motion in the X, Y and Z axial directions.

27. The method of claim 23, further comprising a step of displaying final results of the handwriting recognition.

28. The method of claim 19, further comprising the steps of wirelessly transmitting the 3D motion data and wirelessly receiving the 3D motion data for calculating the 3D coordinates.

29. The method of claim 19, further comprising the step of measuring acceleration of the 3D motion in X, Y and Z axial directions and wherein the 3D motion data are generated based on the acceleration of the 3D motion in the X, Y and Z axial directions.

* * * * *